Dec. 3, 1929.  J. T. URQUHART  1,738,085
FERTILIZER DISTRIBUTOR
Filed Jan. 19, 1928  3 Sheets-Sheet 1
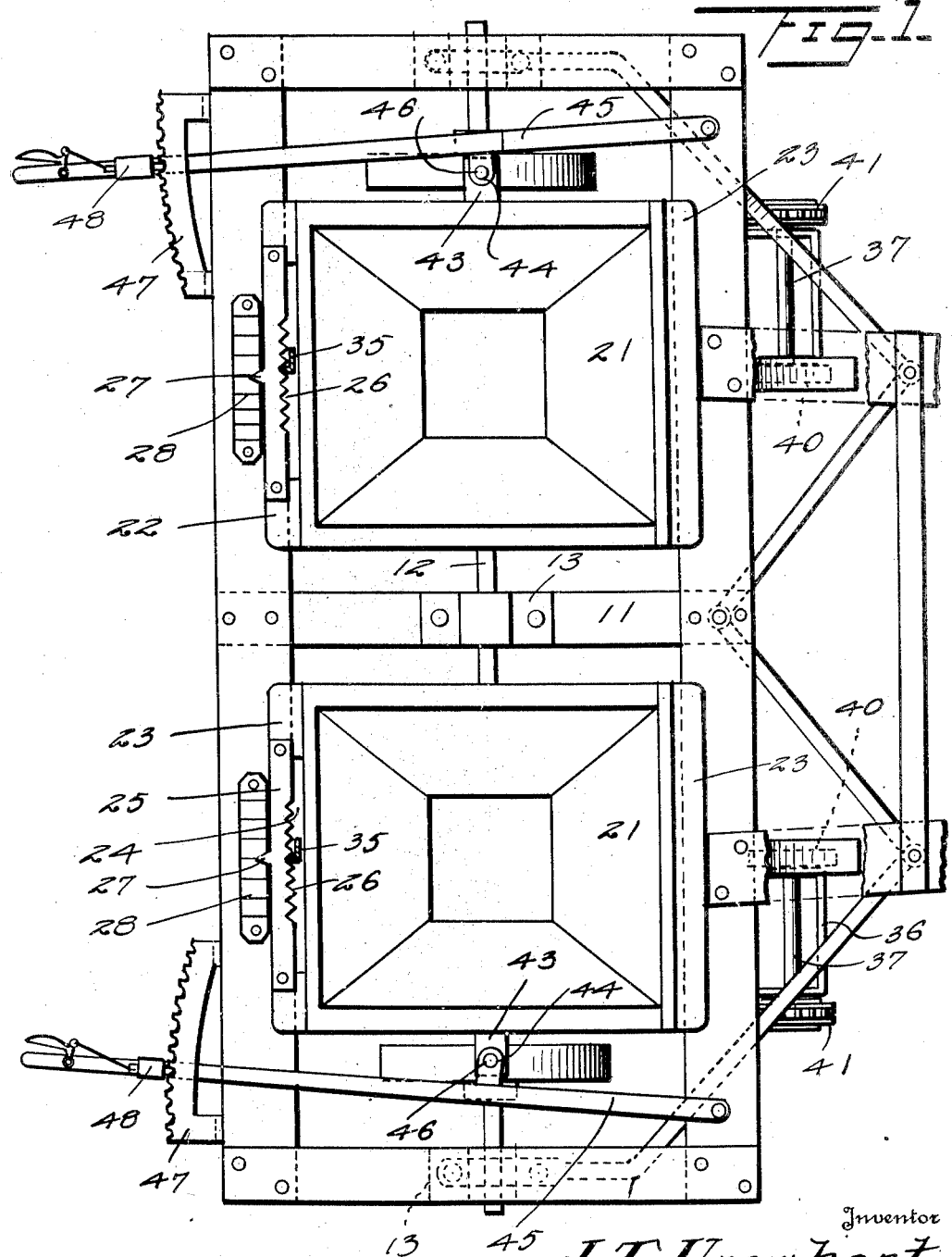
Inventor
J. T. Urquhart
By Watson E. Coleman
Attorney

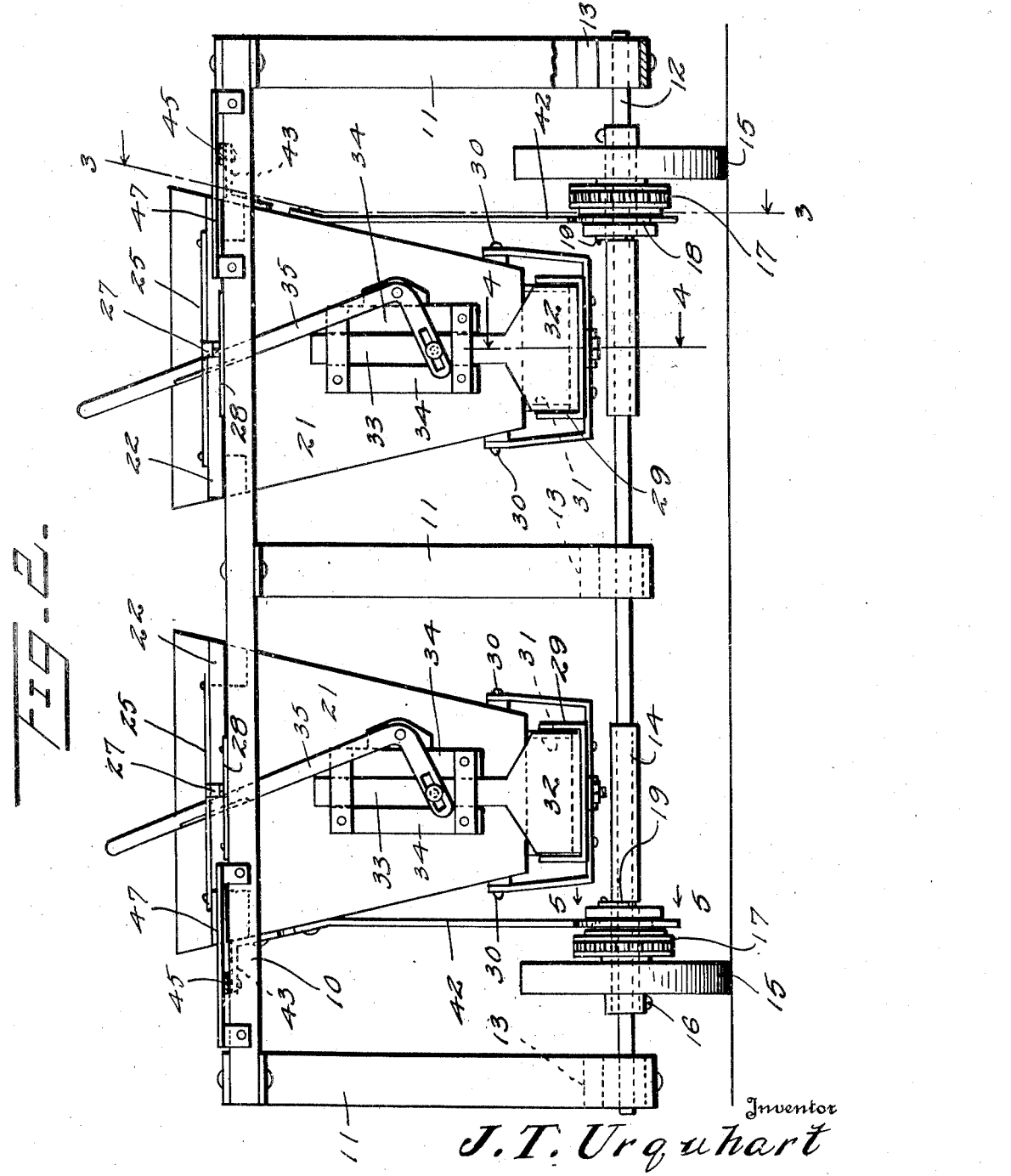

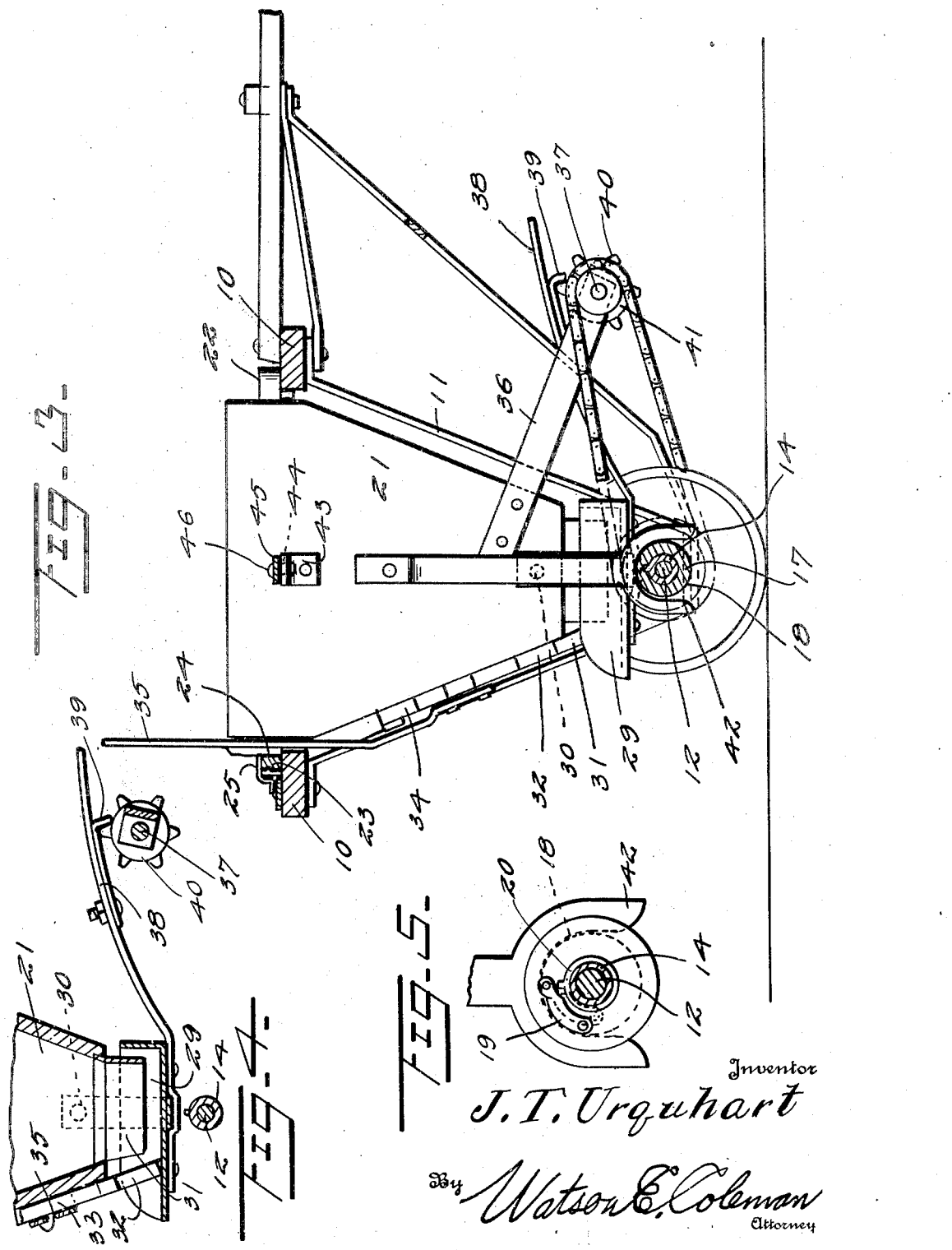

Patented Dec. 3, 1929

1,738,085

UNITED STATES PATENT OFFICE

JESSE THOMAS URQUHART, OF NEAR ZUNI, VIRGINIA

FERTILIZER DISTRIBUTOR

Application filed January 19, 1928. Serial No. 247,902.

This invention relates to fertilizer distributors.

An important object of the invention is the production in a device of this character of a structure permitting ready adjustment of the distributing elements to compensate for variations in the widths of planted rows which are being supplied with fertilizer.

A further and more specific object of the invention is to provide a construction such that the position of the ground wheels of the distributor may be controlled to insure positioning of these wheels during change in position of the distributors at such a point that they will not contact with or damage the plants in the rows.

A further object of the invention is the provision of a device of this character which may be relatively cheaply manufactured, which will be durable and efficient in service and a general improvement in the art.

These and other objects I attain by the construction shown in the accompanying drawings, wherein for the purpose of illustration is shown a preferred embodiment of my invention and wherein:—

Figure 1 is a plan view of a fertilizer distributor constructed in accordance with my invention;

Figure 2 is a rear elevation thereof;

Figure 3 is a section on the line 3—3 of Figure 2;

Figure 4 is a section on the line 4—4 of Figure 2;

Figure 5 is a section on the line 5—5 of Figure 2.

Referring now more particularly to the drawings, the distributor includes transversely extending parallel frame members 10, to the under surfaces of which are secured the upper ends of V-shaped bracing elements 11, to the bights of which are secured bearings for an axle 12. The braces 11 include intermediate and end braces and the bearings 13 of the end braces are of such character as to prevent endwise movement of the axle. Rotatably mounted upon the axle intermediate each pair of adjacent bearings is a sleeve or bushing 14 exteriorly formed as a pline. To one end of this sleeve is secured a land wheel 15 having a set-screw 16 extended through its hub portion for direct engagement with the axle 12. Slidably mounted upon each spline sleeve 14 is a sprocket 17 having a hub provided with a groove 18. This sprocket bears a latch 19 which, in one position of the sprocket, is engageable in a latch receiving groove 20 formed in the face of the spline sleeve 14, so that the hub is held against longitudinal movement upon this sleeve.

The numeral 21 generally indicates a hopper, the walls of which converge downwardly and whose front and rear walls are provided at their upper ends with ledges 22 and 23 adapted to slidably rest upon the beams 10. The ledge 23 has its inner face notched to provide a space 24 between the hopper wall and the ledge and the upper surface of the ledge has applied thereto a plate 25, one edge of which projects into the space a short distance and is dentate, as at 26, and the opposite edge of which is provided with a pointer 27 coacting with a scale 28 secured to the rear beam 10 and provided with indicia indicating the proper position of the hopper when the hoppers are separated to a predetermined extent. Each hopper has its bottom closed by an oscillatable distributor plate 29 pivoted to the side walls of the hopper, as at 30. The rear wall of the hopper is cut-away adjacent its lower end, as indicated at 31, to provide a discharge opening. This opening is controlled by a gate 32 having a stem 33 mounted in guides 34 carried by the rear wall of the hopper. Pivoted to the rear wall of the hopper and to the stem of the gate is a lever 35, the upper end of which is extended through the space 24 and provided with a ratchet jaw for coaction with the teeth 26.

Extending forwardly from each hopper is a bracket 36 which rotatably mounts a transversely extending shaft 37 at its forward end. Extending from the distributor plate 29 is an arm 38 bearing a downbent catch element 39 which overlies the shaft 37. The shaft 37 at this point is provided with a notched operating wheel 40 and at a second point has secured thereto a sprocket wheel 41. Secured to a side wall of the hopper is a fork 42 adapted to engage in the groove 18 of the associated sprocket wheel 17. One side wall is further provided with a bracket 43 having a pivot opening 44. Pivoted to the forward beam 10 adjacent each hopper is a lever 45 bearing a pivot 46 for engagement in the pivot opening 44 and having its rear end coacting with a notched segment 47. The lever bears the usual latch mechanism 48 for coaction with this segment. The forward transverse beam may provide means for attaching thereto the necessary draft mechanism. In the present instance, this is disclosed as shafts which are suitably braced both to the beam element and to the outer braces 11.

In the operation of the device, as it is moved over the ground, the rotation of the wheels 15 causes rotation of the spline sleeves 14 and accordingly of the sprocket 17. The chains connecting these sprockets and the sprockets 41 of the shafts 37 cause the shafts 37 to be rotated. As the shafts 37 rotate, the teeth of the operating wheel 40 engage the catch element 39, drawing the oscillatable distributor plate 29 forwardly. As the plate moves forwardly, due to the fact that it is pivoted, the arm 38 must also move upwardly and this upward movement releases the catch from the tooth with which it is engaged, permitting the plate to swing rearwardly and the arm to move downwardly, so that a second tooth of the operating gear is engaged when the operation is repeated. This oscillation will cause both agitation of the contents of the hopper and the discharge thereof and the extent of the discharge will be determined by the position of the gate 32. When it is necessary to vary the distance between the hoppers, as when moving the machine from a field where the rows are say forty-six inches apart to a field where they are forty-eight inches apart, this is accomplished by releasing the set-screws 16 of the wheels and engaging the latches 19 in the grooves 20. It will be obvious that at this time, the spline sleeve 14, wheels 15 and sprocket 17 will be shifted as the hopper is shifted to its new position, so that the wheels will still occupy the correct position with relation to the rows. When the new position is attained, the latches 19 are disengaged and the set-screws 16 tightened, holding the wheels against movement, so that when the hoppers 10 are adjusted to compensate for any irregularities of the rows, the wheels will remain stationary and the sprockets 17 merely shift longitudinally of the spline. Thus, if, after adjusting the hoppers and wheels for use with rows spaced four feet, to apply fertilizer directly upon the rows, it is desired to side dress these rows with the fertilizer, it is merely necessary to adjust the hoppers inwardly for the required distance. At this time, the wheels will remain stationary so far as longitudinal movement upon the axle is concerned.

Since the construction hereinbefore set forth is capable of a certain range of change and modification without materially departing from the spirit of the invention, I do not limit myself to such specific structure except as hereinafter claimed.

I claim:—

1. In a fertilizer distributor, a frame, a plurality of hoppers adjustable transversely thereof, a distributing element and a rotatable control element therefor associated with each hopper and moving with the hopper, an axle for the wheels upon which the wheels may be longitudinally adjusted, driving connections between the wheels and the rotatable control element including a sleeve secured to each wheel and gearing connecting the rotatable control elements of each hopper and the sleeve including an element splined upon the sleeve, and a connection between said element and the associated hopper.

2. In a fertilizer distributor, a frame, a plurality of hoppers adjustable transversely thereof, a distributing element and a rotatable control element therefor associated with each hopper and moving with the hopper, an axle for the wheels upon which the wheels may be longitudinally adjusted, driving connections between the wheels and the rotatable control element, including a sleeve secured to each drive wheel, a sprocket splined upon each sleeve, a connection between each sprocket and its associated hopper whereby the sprocket shifts with the hopper, a supporting shaft for the rotatable control element of each hopper, a sprocket on said shaft and a chain connecting the sprockets associated with each hopper.

3. In a fertilizer distributor, a frame, a plurality of hoppers adjustable transversely thereof, a distributing element and a rotatable control element therefor associated with each hopper and moving with the hopper, an axle for the wheels upon which the wheels may be longitudinally adjusted, driving connections between the wheels and the rotatable control element including a sleeve secured to each drive wheel, a sprocket splined upon each sleeve, a connection between each sprocket and its associated hopper whereby the sprocket shifts with the hopper, a supporting shaft for the rotatable control element of each hopper, a sprocket on said shaft, and a chain connecting the sprockets associated with each hopper, each hopper having a bracket secured thereto within which the shaft of the rotatable control element is rotatably mounted.

4. In a fertilizer distributor, a frame, a plurality of hoppers adjustable transversely thereof, a distributing element and a rotatable control element therefor associated with each hopper and moving with the hopper, an axle for the wheels upon which the wheels may be longitudinally adjusted, driving connections between the wheels and the rotatable control element including a sleeve secured to each wheel and gearing connecting the rotatable control elements of each hopper and the sleeve including an element splined upon the sleeve, a connection between said element and the associated hopper, and means carried by and moving with the hoppers for regulating the discharge from the distributing elements thereof.

5. In a fertilizer distributor, a frame, a plurality of hoppers adjustable transversely thereof, a distributing element and a rotatable control element therefor associated with each hopper and moving with the hopper, an axle for the wheels upon which the wheels may be longitudinally adjusted, driving connections between the wheels and the rotatable control element including a sleeve secured to each wheel and gearing connecting the rotatable control elements of each hopper and the sleeve including an element splined upon the sleeve, a connection between said element and the associated hopper, means detachably holding the wheels against longitudinal movement upon the axle, and means for detachably securing the element splined to the sleeve against longitudinal movement on the sleeve.

In testimony whereof I hereunto affix my signature.

JESSE THOMAS URQUHART.